(12) United States Patent
Ormond

(10) Patent No.: US 7,639,713 B2
(45) Date of Patent: Dec. 29, 2009

(54) DATABASE BLOCK NETWORK ATTACHED STORAGE PACKET JOINING

(75) Inventor: John Ormond, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1277 days.

(21) Appl. No.: 10/761,767

(22) Filed: Jan. 21, 2004

(65) Prior Publication Data

US 2005/0157756 A1    Jul. 21, 2005

(51) Int. Cl.
*H04J 3/24* (2006.01)

(52) U.S. Cl. .................. 370/474; 370/230; 370/252; 370/394; 370/395.21; 370/395.4; 370/470; 709/231

(58) Field of Classification Search .............. 370/230, 370/252, 394, 395.21, 395.4, 470, 474; 709/230, 709/231
See application file for complete search history.

(56) References Cited

U.S. PATENT DOCUMENTS

| | | | | |
|---|---|---|---|---|
| 4,841,475 | A | 6/1989 | Ishizuka ..................... | 364/900 |
| 4,918,644 | A | 4/1990 | Terada et al. ................ | 364/900 |
| 5,613,155 | A | 3/1997 | Baldiga et al. .............. | 395/825 |
| 5,901,327 | A | 5/1999 | Ofek ........................... | 395/825 |
| 5,915,094 | A * | 6/1999 | Kouloheris et al. ......... | 709/219 |
| 6,098,149 | A | 8/2000 | Ofer et al. ................... | 711/112 |
| 6,366,987 | B1 | 4/2002 | Tzelnic et al. .............. | 711/162 |
| 6,539,022 | B1 | 3/2003 | Virgile ........................ | 370/401 |
| 6,687,247 | B1 | 2/2004 | Wilford et al. ............. | 370/392 |
| 6,895,483 | B2 * | 5/2005 | Eguchi et al. ............... | 711/165 |
| 7,236,494 | B2 * | 6/2007 | Mallory ...................... | 370/394 |
| 7,274,711 | B2 * | 9/2007 | Kajizaki et al. ............. | 370/473 |
| 7,283,483 | B2 * | 10/2007 | Asawa et al. ................ | 370/252 |
| 7,299,290 | B2 * | 11/2007 | Karpoff ...................... | 709/231 |
| 7,460,473 | B1 * | 12/2008 | Kodama et al. ............. | 370/230 |
| 2002/0097750 | A1 * | 7/2002 | Gunaseelan et al. ........ | 370/503 |
| 2003/0217119 | A1 | 11/2003 | Raman et al. ............... | 709/219 |
| 2004/0059822 | A1 | 3/2004 | Jiang et al. .................. | 709/230 |
| 2004/0205206 | A1 * | 10/2004 | Naik et al. .................. | 709/230 |
| 2005/0030972 | A1 * | 2/2005 | Madukkarumukumana et al. ........................... | 370/463 |

OTHER PUBLICATIONS

Encyclopedia of Computer Science; Third Edition; Reprinted 1995, International Thompson Computer Press, Boston. MA, pp. 412-416.

(Continued)

*Primary Examiner*—William Trost, IV
*Assistant Examiner*—Toan D Nguyen
(74) *Attorney, Agent, or Firm*—Richard Auchterlonie; Novak Druce & Quigg, LLP

(57) ABSTRACT

A performance problem is caused by network transmission frames being only partially filled with I/O request packets from the on-line transaction processing applications. This problem is solved by programming the host processor to join the I/O request data packets from different applications in the same network transmission frames to more completely fill the frames. For example, the I/O request data packets are joined into the frames and each data packet is transmitted in a frame after a delay of no more than a certain time interval. At least some of the frames are transmitted once these frames are filled with some of the data packets so that each of these frames cannot contain an additional data packet. Preferably the certain time interval is adjusted based on network loading so that the certain time interval is increased for increased loading.

40 Claims, 12 Drawing Sheets

OTHER PUBLICATIONS

"*Network Attached Storage Solutions—Consolidate file serving for reduced costs, improved efficiencies*;" EMC Corporation, Hopkinton, MA, http://www.emc.com/products/networked/nas/index.jsp; 2 pages, printed Dec. 31, 2003.

"*EMC Celerra HighRoad—Multi-path file sharing software*;" EMC Corporation, Hopkinton, MA, http://www.emc.com/products/software/highroad.jsp; 2 pages, printed Dec. 31, 2002.

"*EMC Oracle Database on NAS Accelerator Service*;" EMC Solution Brief; EMC Corporation, Hopkinton, MA, 2003, pp. 1-2.

Schafer, Rob, "*Database on Network-Attached Storage: Choose Wisely*;" META Practice; Jul. 29, 2003; pp. 1-7.

Ritacco, Michael, "*Study Brief Oracle8 Performance Tuning*; ", Oraclenotes.com; http://www.oraclenotes.com/Certification/study_brief/ocp8_SB_performance tuning.htm ; Printed Dec. 22, 2003; pp. 1-16.

"*Triggers*;" Database Knowledge Base; Posted by Sures on Friday, Apr. 26, 2002 at 10:30 a.m.; http://database.ittoolbox.com/groups/groups.asp?v=oracle-db-l&I=88861; printed Dec. 22, 2003.

\* cited by examiner

DATABASE BLOCK NETWORK ATTACHED STORAGE PACKET JOINING

BACKGROUND OF THE INVENTION

1. Field of the Invention

The present invention relates generally to data processing networks, and more particularly to database systems and network attached storage.

2. Description of Related Art

Database systems use block-level access to a database in data storage. A database application issues block I/O requests to the database. Well-known database applications include the IBM DB2, Oracle 8, and Sybase. The database applications may support on-line transaction processing and batch processing.

Traditionally, the database application ran on a host processor such a mainframe computer, and the database was stored in one or more disk drives directly attached to the host processor. In the last couple of years, however, some database systems have used network attached storage (NAS). For example, Celerra (Trademark) brand network attached storage is sold by EMC Corporation, 176 South Street, Hopkinton, Mass. 01748. There can be considerable savings in storage cost and data management cost because multiple host processors can share the network attached storage.

SUMMARY OF THE INVENTION

It has been discovered that many database applications using network attached storage suffer a significant degradation in performance under high loading conditions due to inefficient packing of block-level I/O requests into the network data transport packets. For Transmission Control Protocol (TCP) transmission over an IP network, for example, the IP network is often configured for a maximum transfer unit (MTU) frame size of 9000 bytes, which is sufficient for transporting an 8 kilobyte data block in each frame. When a host processor is concurrently executing multiple on-line transaction processing (OLTP) application, many of the 9000 MTU frames will be less than half full, and some of the frames will contain less than 500 bytes. There is a considerable waste of host processing time and network bandwidth for transporting many nearly empty frames.

In accordance with one aspect, the invention provides a method of processing a series of data packets for transmission over a data network in a series of frames in which at least some of the frames contain multiple data packets. Each data packet in the series of data packets has a respective time in a time sequence. Each frame is capable of transmitting a certain amount of data. The method includes successively joining data packets from the time sequence into the frames and transmitting each data packet in at least one of the frames no later than a certain time interval after the respective time of said each data packet in the time sequence. The method also includes transmitting each frame in a first set of the frames upon filling said each frame in the first set of frames with data from one or more of the data packets so that said each frame in the first set of frames cannot contain an additional data packet, and transmitting each frame in a second set of the frames which are not filled with at least some of the data packets so that said each frame in the second set of the frames cannot contain an additional data packet in order to ensure that said each data packet is transmitted in at least one of the frames no later than the certain time interval after the respective time of said each data packet in the time sequence.

In accordance with another aspect, the invention provides a method of operation in a host processor programmed for executing on-line transaction processing applications and having a network block storage interface for accessing network attached storage coupled to the host processor via a data network. The method includes the host processor joining the I/O request data packets from different ones of the on-line transaction processing applications in the same network transmission frames to more completely fill the network transmission frames.

In accordance with yet another aspect, the invention provides a method of solving a performance problem in a host processor programmed for executing on-line transaction processing applications and having a network block storage interface for accessing network attached storage coupled to the host processor via a data network. The performance problem is caused by network transmission frames being only partially filled with I/O request packets from the on-line transaction processing applications. The performance problem is solved by re-programming the host processor to join the I/O request data packets from different ones of the on-line transaction processing applications in the same network transmission frames to more completely fill the network transmission frames.

In accordance with a final aspect, the invention provides a host processor programmed for executing on-line transaction processing applications and having a network block storage interface for accessing network attached storage coupled to the host processor via a data network. The host processor is programmed for joining the I/O request data packets from different ones of the on-line transaction processing applications into the same network transmission frames to more completely fill the network transmission frames.

BRIEF DESCRIPTION OF THE DRAWINGS

Other objects and advantages of the invention will become apparent upon reading the detailed description with reference to the drawings, in which.

Figure 1:
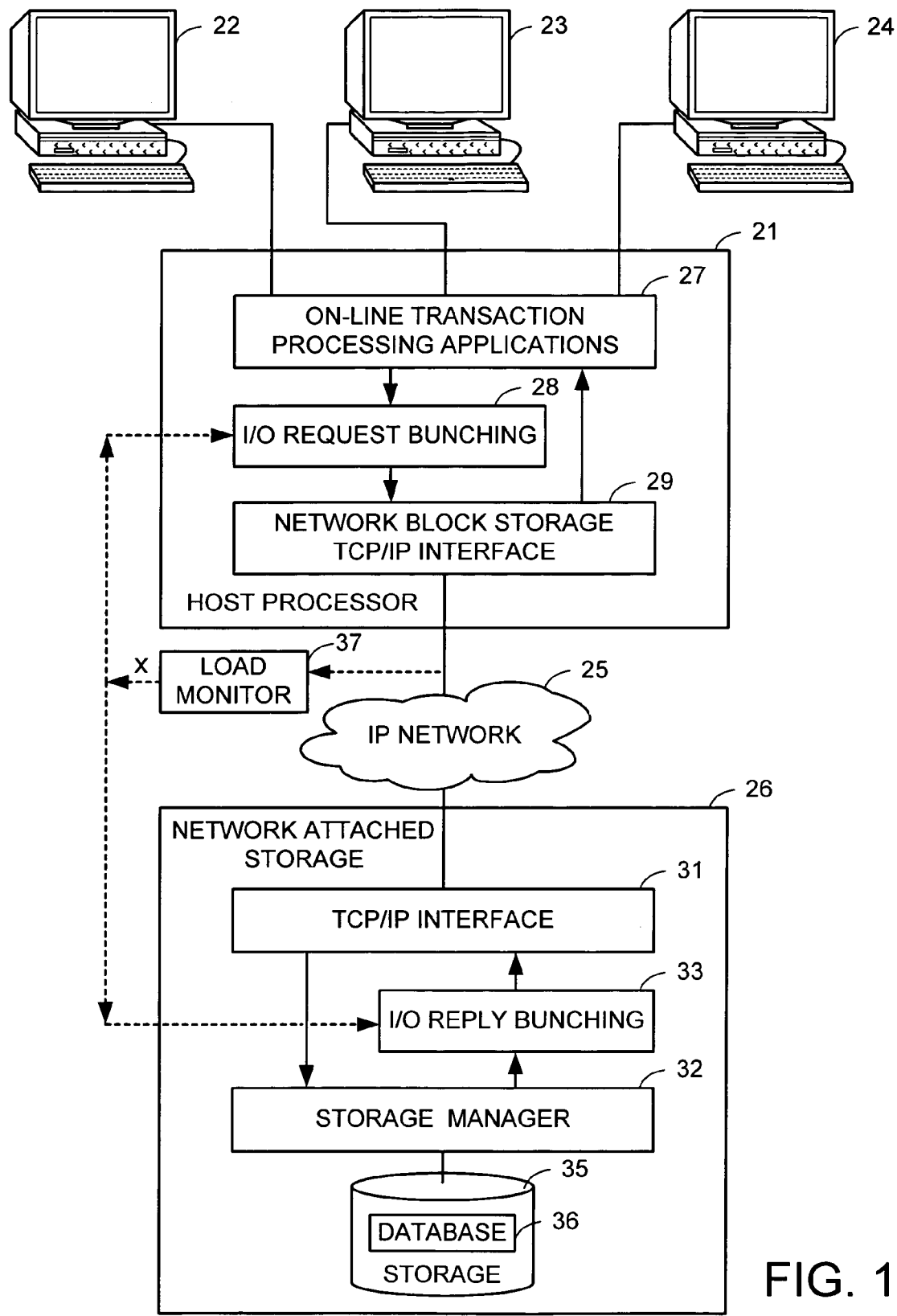
FIG. 1 is a block diagram of a data processing system incorporating the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a data processing system incorporating the present invention. The data processing system includes a host processor 21 coupled to multiple user terminals 22, 23, 24 for on-line transaction processing. The host processor 21 is also coupled via an IP network 25 to network attached storage 26.

The host processor includes on-line transaction processing applications 27 that send block-level I/O requests down to a network block storage TCP/IP interface 29. For example, the on-line transaction processing applications are separate instances of a transaction processing program such as an accounting program for handling accounts receivable. For each transaction, such as the processing of a single check, a customer's account of money owed is debited by the amount of the check, and a vendor's account of money received is credited by the amount of the check. The block-level I/O requests, for example, are SCSI or SCSI-3 commands.

The Network Block Storage TCP/IP interface 29 receives data packets from the on-line transaction processing applications 27, and each data packet includes one or more block-level I/O requests. Upon receipt of a data packet, the Network Block Storage TCP/IP interface places the data from the data packet in as many MTU frames as required to hold all of the data of the data packet, and sends the MTU frames over the IP network to the network attached storage 26.

The network attached storage 26 has a TCP/IP interface for removing the block-level I/O requests from the MTU frames, and sending the block-level access commands to a storage manager 32 that manages storage 35 containing a database 36. The storage manager 32 maps logical block addresses referenced in the block-level I/O requests to physical addresses in the storage 35.

It has been discovered that in an on-line transaction processing system employing network storage as described above, there is a significant degradation in performance under high loading conditions due to inefficient packing of block-level I/O requests into the MTU frames. In particular, each of the on-line transaction processing applications 27 may group a number of I/O requests together in a data packet before sending the data packet down to the network block storage TCP/IP interface 29, but I/O requests from one on-line transaction processing application are not grouped with another on-line transaction processing application in a data packet. In contrast to an off-line or batch transaction processing application, a majority of the data packets from an on-line transaction processing application may have a relatively small size compared to the MTU frame size. For example, the data packets are often only 500 bytes, and the MTU frame size is typically configured as either 1,500 bytes or 9,000 bytes.

Figure 2:
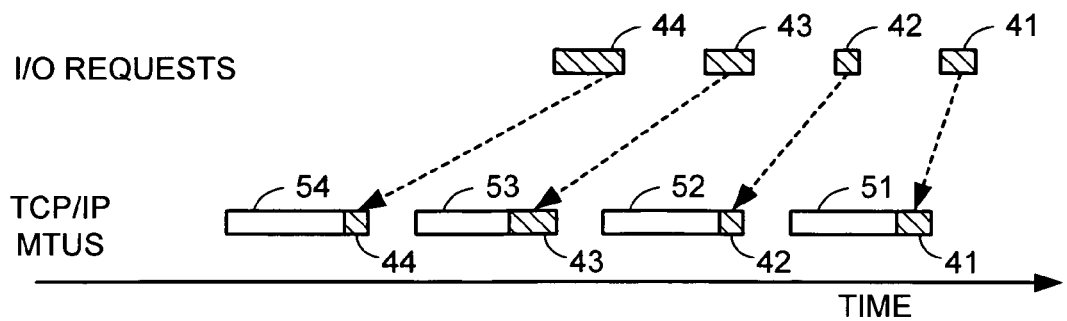
FIG. 2 shows an inefficient method of packing I/O requests into TCP/IP MTU frames.

FIG. 2 for example, shows a series of I/O request packets 41, 42, 43, and 44 for a system in which a host processor is concurrently executing multiple on-line transaction processing (OLTP) applications. The I/O request packets 41, 42, 43, and 44 are transmitted in respective TCP/IP MTU frames 51, 52, 53, 54. In this system, each I/O request packet may include one or more requests, but each I/O request packet originates from one of the applications. Moreover, each of the I/O request packets is placed in a respective one of the MTU frames. For I/O request packets that are small in comparison to the MTU frame size, there is a considerable waste of host processing time and network bandwidth for transporting many nearly empty frames.

Figure 3:
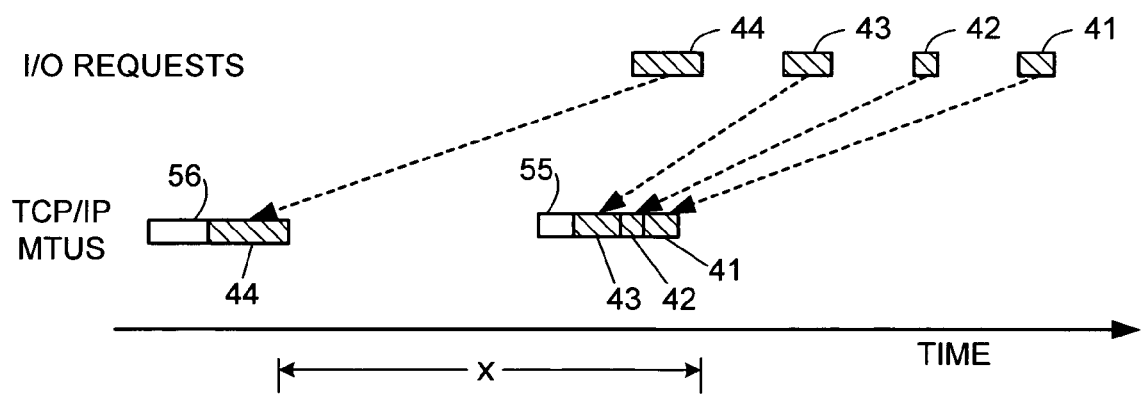
FIG. 3 shows a more efficient method of packing I/O requests into TCP/IP frames.

The problem introduced in FIG. 2 can be solved by joining I/O requests as shown in FIG. 3. A number of the I/O request packets 41, 42, and 43 are joined together and placed in the same MTU frame 55 until no more of the I/O request packets can be placed in the MTU frame. As described further below, such joining of the data packets into an MTU frame and initiation of transmission of the MTU frame can be performed by a main routine 61 in FIG. 4. Therefore, the frame 55 becomes filled with data packets 41, 42, 43 so that the frame contain the additional data packet 44. Some delay is introduced in the transmission of most of the I/O request packets, but this delay can be limited to a certain value "x". For example, the I/O request 44 is transmitted alone in the MTU frame 56 to ensure that the delay is limited to the certain value "x". As described further below, the transmission of such frames to satisfy the delay constraint can be initiated by a timer interrupt routine 62 in FIG. 4.)

In the host processor 21 of FIG. 1, each of the on-line transaction processing applications 27 sends block level I/O requests to the I/O request bunching module 28. When the I/O request bunching module 28 receives an I/O request that is smaller than the MTU frame size, the I/O request bunching module will attempt to join the I/O request with another block-level I/O request in order to more completely fill an MTU frame. However, the I/O request bunching module 28 will not withhold an I/O request from the network block storage TCP/IP interface 29 for more than a certain time interval "x". When the network block storage TCP/IP interface 29 receives an I/O request or joined I/O requests, it packs the I/O request or the joined I/O requests in as many MTU frames as needed and transmits the MTU frames over the IP network 25 to the network attached storage 26. The network block storage TCP/IP interface is configured to use the 9000 byte MTU frame size. In the future, if the TCP/IP interface could be configured to use an MTU frame size larger than 9000 bytes, then it may be desirable to use the larger MTU frame size.

In the network attached storage 26, the TCP/IP interface strips the I/O requests from the MTU frames, and sends the I/O requests to the storage manager 32. The storage manager 32 interprets the I/O requests for read and write access to the database 36 in storage 35, and formulates a reply to each I/O request. The replies are received in an I/O reply bunching module 33. The I/O reply bunching module 33 functions in a similar fashion as the I/O request bunching module 28. In particular, when the I/O reply bunching module 33 receives an I/O reply that is smaller than the MTU frame size, the I/O reply bunching module will attempt to join the I/O reply with another I/O reply in order to more completely fill an MTU frame. However, the I/O reply bunching module will not withhold an I/O reply from the network block storage TCP/IP interface 29 for more than a certain time interval "x", which can be the same time interval used by the I/O request bunching module.

For request or reply bunching, the time interval "x" can be initially selected based on application type. For example, the time interval "x" can be set as a fraction of the nominal I/O response time for the on-line transaction processing application. The nominal I/O response time is an average I/O response time of the application when request and reply bunching is not used and the IP network is lightly loaded. In particular, for an application having a nominal I/O response time of 15 milliseconds, the value of "x" can be 5 milliseconds.

It is also desirable to disable I/O request bunching if large bursty transactions occur so that most of the MTU frames would become nearly full without joining I/O requests or replies. Such large bursty transactions occur in Datawarehouse databases where bulk database data is being moved to and from the database. A bunching flag can be set and cleared to enable and disable the bunching of I/O requests and replies. This bunching flag could be cleared when the bulk database transfers occur and otherwise set. The bunching flag could also be cleared during certain times of the day when bulk database transfers are likely to occur.

Figure 4:
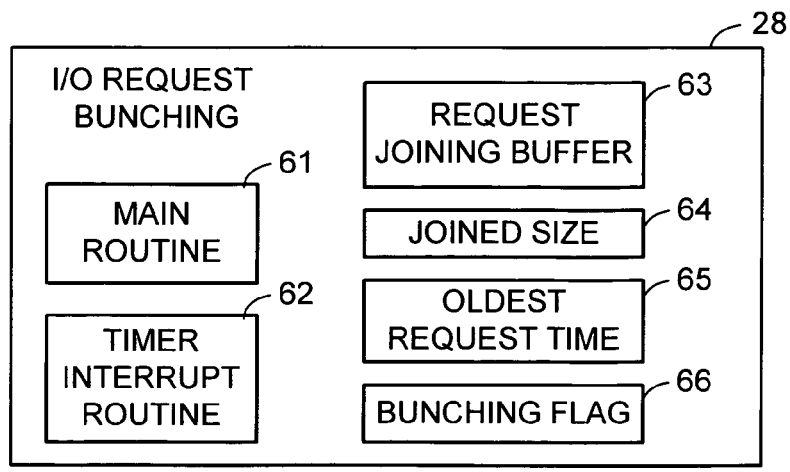
FIG. 4 shows various routines and data structures in an I/O request bunching module introduced in FIG. 1.

The request bunching module 28 in FIG. 1 can be constructed in various ways. One way is shown in FIG. 4. The request module 28 includes a main routine 61, a timer interrupt routine 62, a request joining buffer 63, a joined size variable 64, an oldest request time variable 65, and a bunching flag 66. The I/O reply bunching module (33 in FIG. 1) can be constructed in the same fashion.

The request bunching module 28 in FIG. 1 could be programmed to function in various ways. One way is for the request bunching module to be an add-in program that intercepts I/O request data packets sent from the on-line transaction processing applications to the network block storage TCP/IP interface. In the absence of the I/O request bunching module 28, the network block storage TCP/IP interface would receive each I/O request data packet, pack the respective I/O request data packet into one or more MTU frames, and then transmit the MTU frames over the IP network 25.

During bunching, the I/O request bunching module 28 receives a series of consecutive input I/O request data packets from the on-line transaction processing applications 27, joins the respective I/O request data packets from the consecutive I/O requests to form a joined I/O request data packet, and then transmits the joined I/O request data packet to the network block storage TCP/IP interface 29. The process of joining consecutive I/O requests to form the joined I/O request data packet will terminate with the transmission of the joined I/O data packet to the network block storage TCP/IP interface once the joined data packet reaches the MTU frame data block size (e.g., 8 kilobytes for a 9000 MTU frame) or when needed to ensure that transmission of the joined I/O data packet is not delayed by more than the time interval "x".

When the I/O request bunching module is constructed as an add-in program, it is desirable for the request bunching module to use very few host processor execution cycles for processing each I/O request data packet intercepted from the on-line transaction processing applications, and to use very few host processor execution cycles for transmitting each joined I/O request to the network block storage TCP/IP interface 29. For example, a timer interrupt routine 62 separate from the main routine 61 is used to check whether the time interval "x" has expired instead of programming the main routine 61 to check for expiration of the time interval "x" each time that the main routine processes an I/O request intercepted from the on-line transaction processing applications 27. This significantly reduces the number of host processor execution cycles used when processing a large number of small I/O request data packets over a short interval of time.

Figure 5:
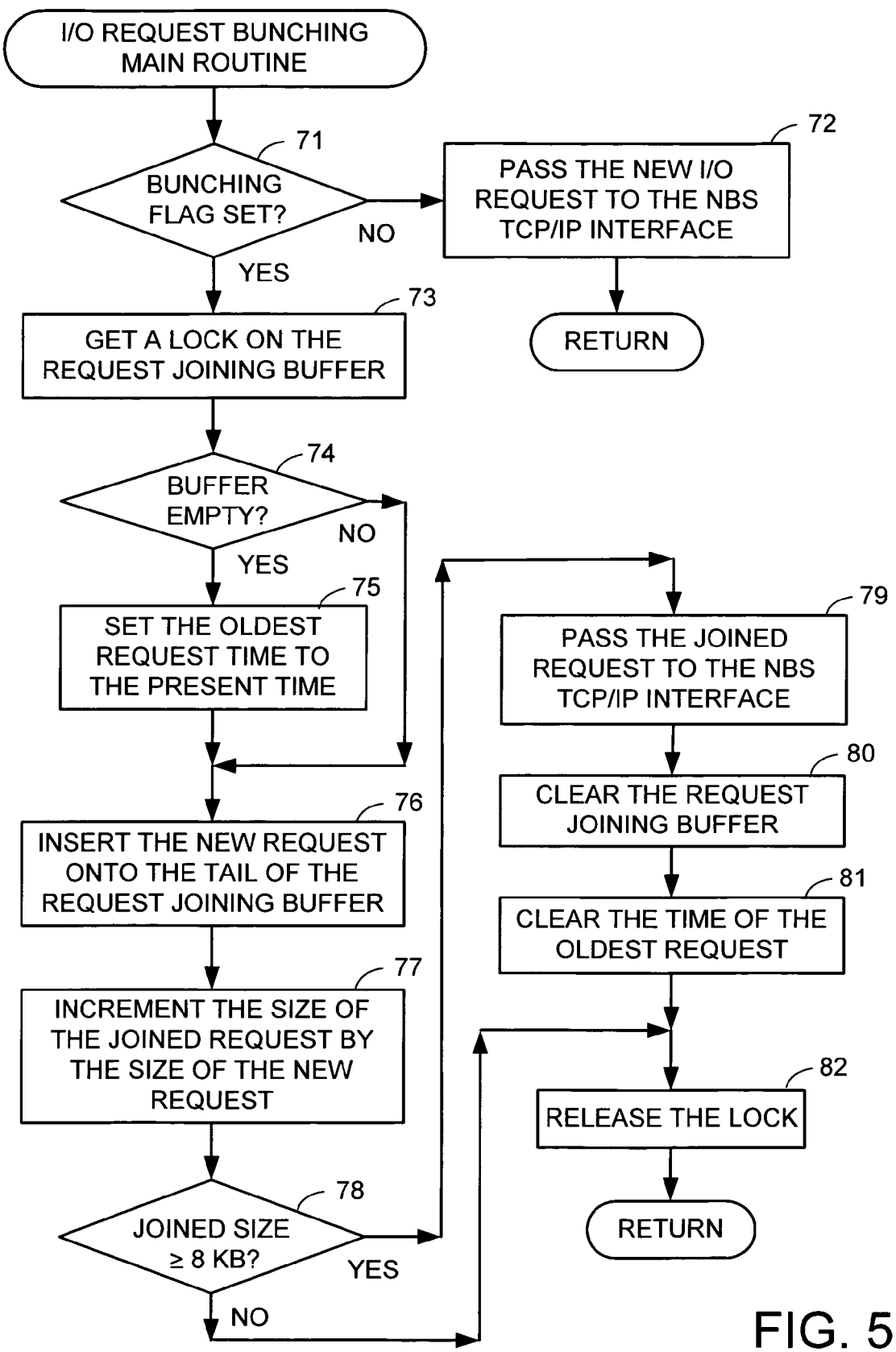
FIG. 5 is a flowchart of an I/O request bunching main routine.

FIG. 5 shows a flowchart for the main routine of the I/O request bunching module. This routine is started when one of the on-line transaction processing applications sends a new I/O request data packet to the I/O request bunching module. In a first step 71, if the bunching flag is not set, then execution branches to step 72 to pass the new I/O request data packet to the network block storage TCP/IP interface, and the main routine is finished.

In step 71, if the bunching flag is set, then execution continues from step 71 to step 73. In step 73, the main routine gets a lock on the request joining buffer. This lock is used to avoid conflict since access to the request joining buffer is shared at least with the timer interrupt routine. In step 74, if the buffer is empty, then execution continues to step 75. In step 75, the oldest request time variable is set to the present time. Execution continues from step 75 to step 76. Execution also continues to step 76 from step 74 when the request joining buffer is not empty.

In step 76, the main routine inserts the new I/O request data packet onto the tail of the request joining buffer. In step 77, the main routine increments the size of the joined request (i.e., the joined size variable) by the size of the new I/O request data packet. In step 78, if the joined size is greater or equal to 8 kilobytes, then execution continues to step 78. In step 79, the joined request is passed to the NBS TCP/IP interface. In step 80, the request joining buffer is cleared. In step 81, the time of the oldest request is cleared. (For the comparison in step 92 as described below, the time of the oldest request should be cleared by setting it to a very high value, always representing a time in the future, so that the timer interrupt routine effectively does nothing until the time of the oldest request becomes set to the present time in step 75.) In step 82, the lock on the request joining buffer is released, and the main routine is finished.

In step 78, if the joined size is not greater than or equal to 8 kilobytes, then execution continues to 82 to release the lock, and the main routine is finished.

Figure 6:
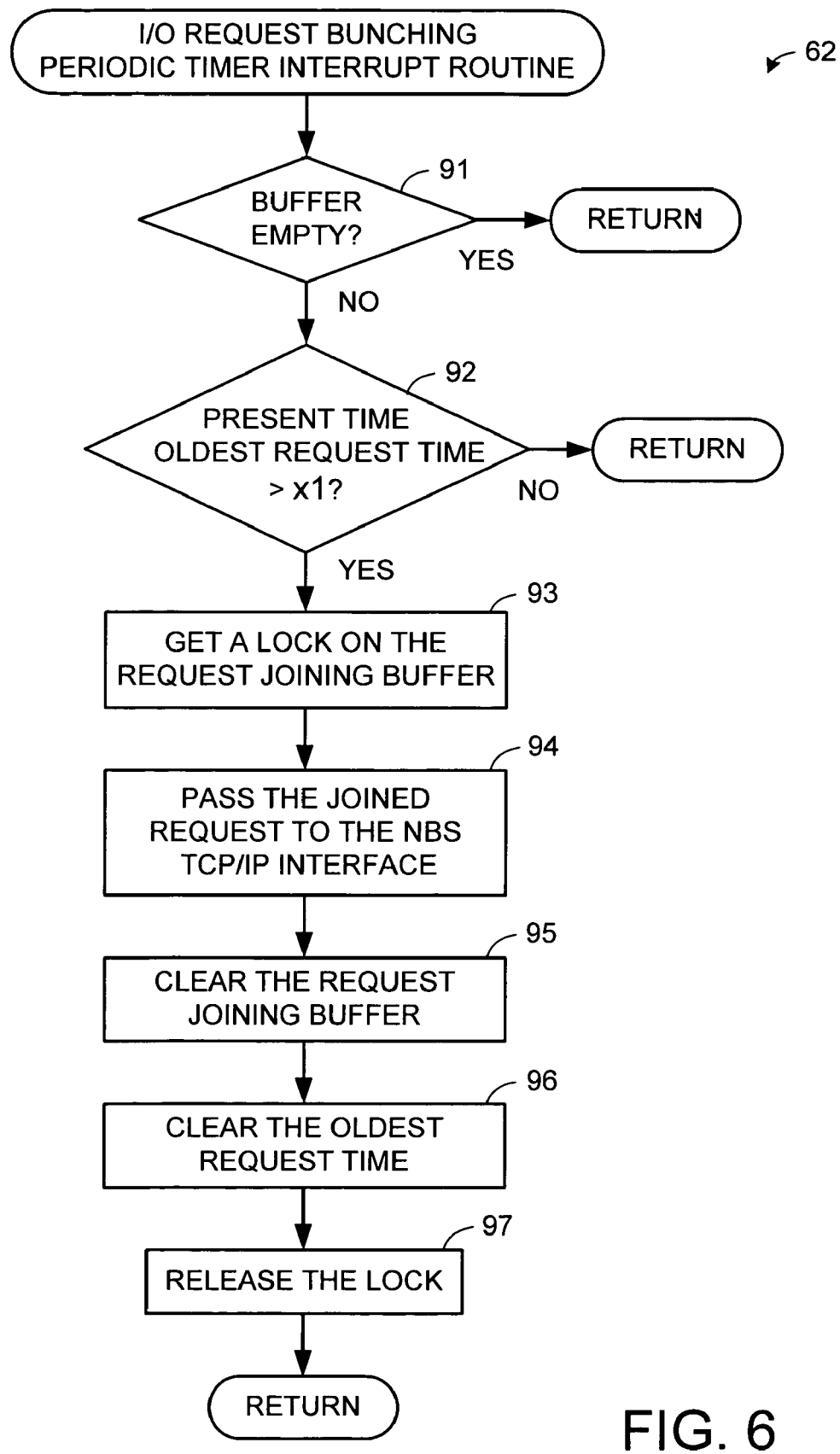
FIG. 6 is a flowchart of an I/O request bunching periodic timer interrupt routine.

FIG. 6 shows the timer interrupt routine 62. This routine is executed periodically, for example, once every millisecond. In a first step 91, if the request joining buffer is empty, then the timer interrupt routine is finished. Otherwise, execution continues from step 91 to step 92. In step 92, if the difference between the present time and the value of the oldest request time variable is not greater than "x1", then execution returns. Otherwise, the time interval "x1" has been exceeded, and execution continues from step 92 to step 93. "x1" is the time interval "x" referred to above minus the period of the periodic interrupt of FIG. 6.

In step 93, the periodic timer interrupt routine gets a lock on the request joining buffer. In step 94, the joined request is passed to the network block storage TCP/IP interface. In step 95, the request joining buffer is cleared. In step 96 the oldest request time is cleared, for example, by setting it to a very high value representing a time that is always in the future. In step 97, the lock on the request joining buffer is released, and the timer interrupt routine is finished.

Figure 7:
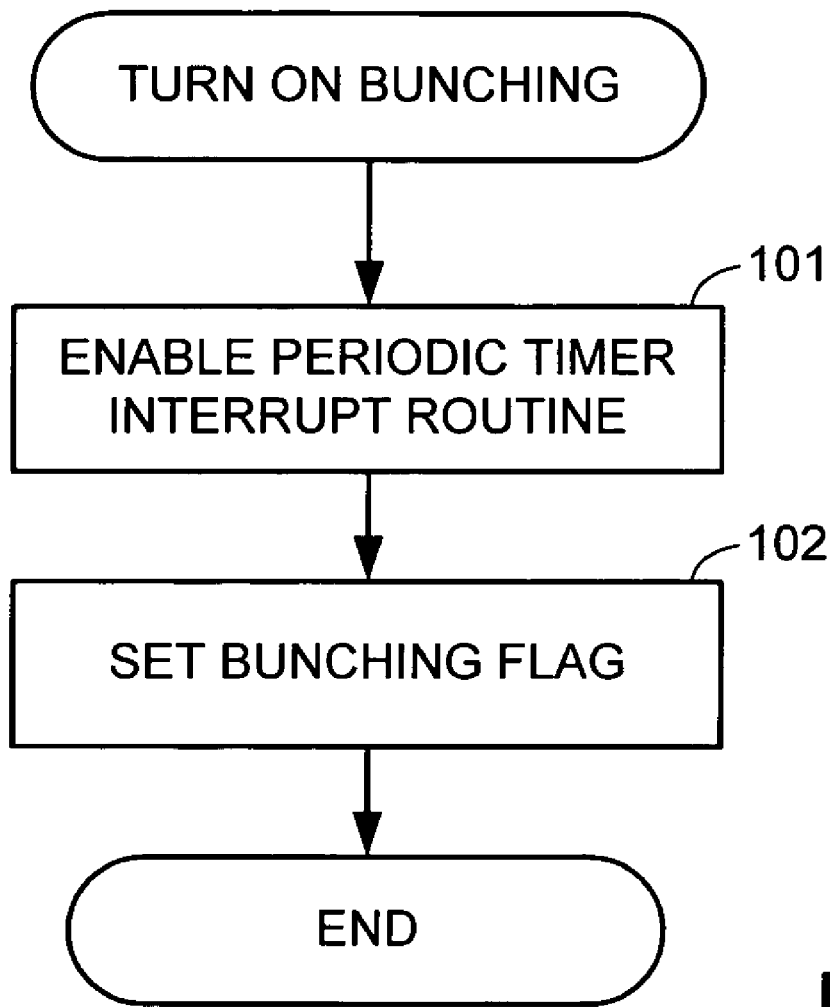
FIG. 7 is a flowchart of a procedure for turning on bunching of I/O requests.

Bunching can be turned on and off dynamically. For example, FIG. 7 shows a procedure for turning on bunching. In a first step 101, the periodic timer interrupt routine is enabled. In step 102, the bunching flag is set, and the procedure is finished.

Figure 8:
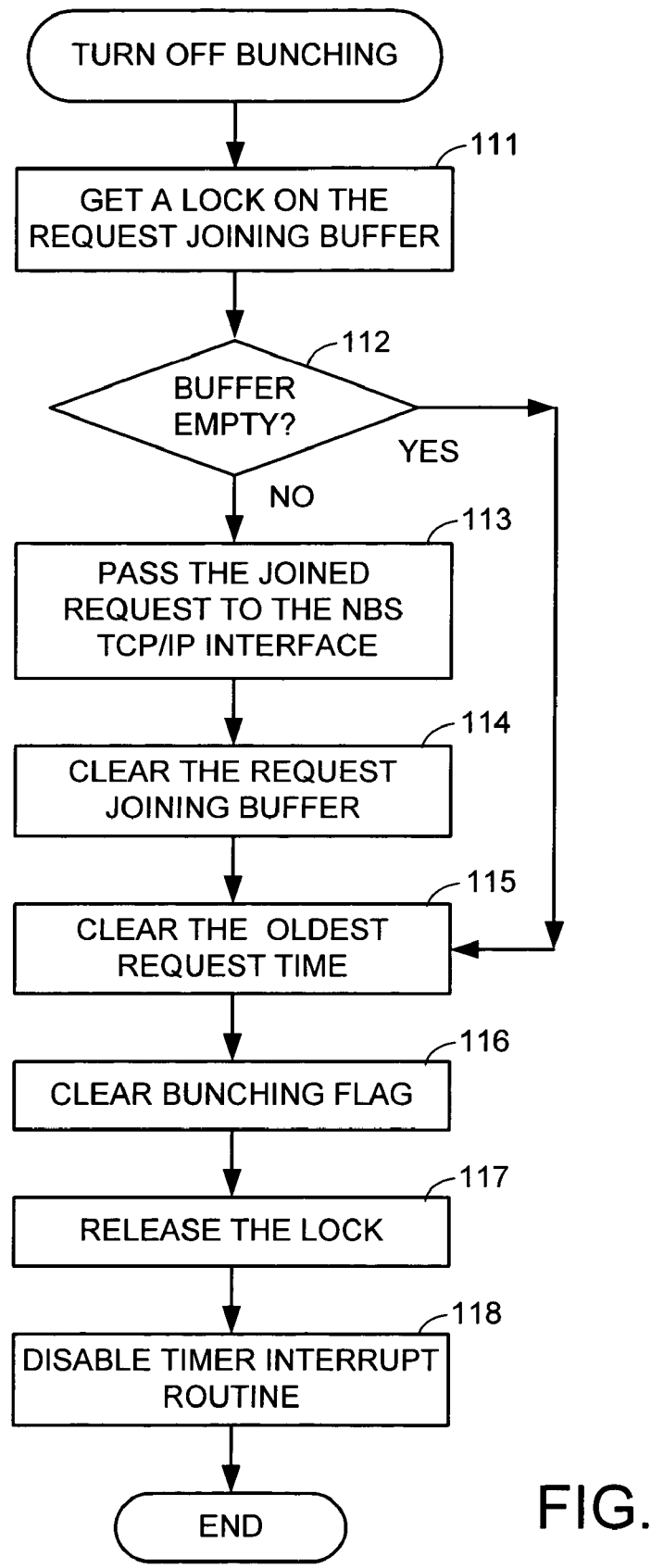
FIG. 8 is a flowchart of a procedure for turning off bunching of I/O requests.

FIG. 8 shows a procedure for tuning off bunching. Bunching is turned off in such a way that the request joining buffer is flushed and the timer interrupt routine is disabled. In a first step 111, a lock is obtained on the request joining buffer. In step 112, if the buffer is not empty, execution continues to step 113. In step 113, the joined I/O request data packet is passed to the network block server TCP/IP interface. In step 114, the request joining buffer is cleared. Execution continues from step 114 to step 115. Execution also continues to step 115 from step 112 when the request joining buffer is empty.

In step 115, the oldest request time is cleared, for example, by setting it to a very high value representing a time that is always in the future. In step 116, the request bunching flag is cleared. In step 117, the lock on the request joining buffer is released. In step 118, the timer interrupt routine is disabled, and the procedure is finished.

The time interval "x" can also be dynamically adjusted based on loading characteristics of the IP network. For example, the data processing system of FIG. 1 has a load monitor 37 that measures loading of the IP network with respect to the handling of the I/O request and replies, and uses the measured loading to adjust the time interval "x". For example, the measured loading ranges from zero for no loading, to one for saturation of the IP network for the transmission of the I/O requests and replies. The time interval "x" can be adjusted based on a formula of the loading such as:

$$x = x_{min} + (x_{max} - x_{min})(\text{loading})$$

In this example, the time interval "x" ranges from a minimum of $x_{min}$ for a loading of zero to a maximum of $x_{max}$ for a loading of one. The value of $x_{max}$ can be set to a fraction of the nominal I/O response time, and the value of $x_{min}$ can be set to a convenient minimum time for the checking for joined requests over the interval "x". In particular, for an application having a nominal I/O response time of 15 milliseconds, the value of "$x_{max}$" can be 7 milliseconds, and the value of "$x_{min}$" can be 1 or 2 milliseconds.

The value of "x" could also be adjusted or based on the average size of the data blocks in the database 35 or the average size of the I/O request packets as received by the I/O request bunching. For example, for larger I/O request packet size, a smaller size of "x" could be used. If the I/O request packet size is substantially different from the I/O reply packet size, then it may be desirable for the size of "x" for the I/O request bunching 28 to be different from the size of "x" for the I/O reply bunching.

The value of "x" can be adjusted dynamically based on data activity or caching algorithms in the host processor 21 and in the network attached storage 26 in addition to the monitored loading on the IP network. Estimated loading on the IP network could also take into account activity of any other hosts that may share the IP network 25. The average size of a data block in the database 35 could be dynamically calculated in the applications 27 and passed down to the I/O request bunching module for adjustment of "x". The average size of the I/O request packets as received by the I/O request bunching could be dynamically calculated in the I/O request bunching module itself.

The I/O request bunching module could also estimate its loading on the IP network by accumulating the average number of blocks of joined requests per unit time and the average number of bytes in the joined requests per unit time, computing an estimate of the loading as a function of the average number of blocks of joined requests per unit time and the average number of bytes in the joined requests per unit time, and adjusting "x" based on the computed estimate of the loading.

In short, the value of "x" can be continually reset to achieve the best performance in database access based on the current processing environment and I/O activity of the host processor 21 and the network attached storage 26. The end result is a more intelligent NAS transfer mechanism in which an optimum amount of small database blocks in the I/O request and replies are accumulated and packed into the MTU frames.

Figure 9:
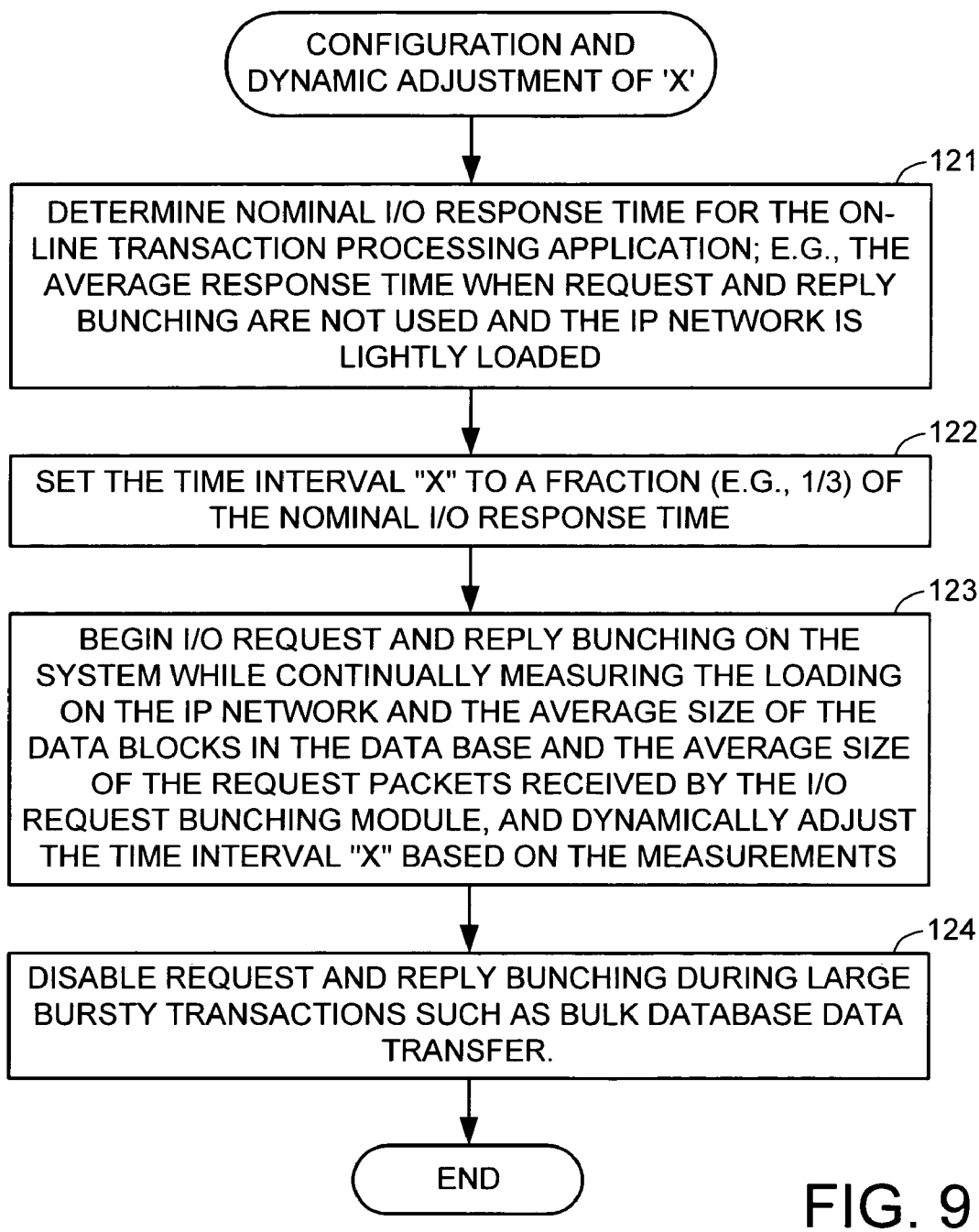
FIG. 9 is a flowchart of a procedure for configuration and adjustment of a time interval "x" which, when exceeded, causes dumping of joined I/O requests to a TCP/IP interface.

FIG. 9 summarizes the configuration and dynamic adjustment of the time interval "x". In a first step 121, the nominal I/O response time for the on-line transaction processing application is determined. For example, the nominal I/O response time is the average response time when request and reply bunching are not used and the IP network is lightly loaded. In step 122, the time interval "x" is set to a fraction such as one-third of the nominal I/O response time. In step 123, I/O request and reply bunching is begun on the system while continually measuring the loading on the network and the average size of the data blocks in the data base and the average size of the request packets received by the I/O request, and dynamically adjusting the time interval "x" based on the measurements. In step 124, the I/O request and reply bunching is disabled during large bursty transactions such as bulk database data transfer.

In many systems, there is no need to preserve the ordering of read I/O requests with respect to write I/O requests as the I/O requests are transmitted from the on-line transaction processing applications to the network attached storage. In this case, it may be possible to improve performance by separately bunching the read I/O requests together, separately bunching the write I/O requests together, and dumping the bunched read I/O requests before dumping the bunched write I/O requests when the time interval "x" is exceeded. This improves performance because the I/O response time for reads is generally faster than the I/O response time for writes. In addition, the bunched read requests and the bunched write requests may tend to access separate localized regions of memory so that there is a performance gain due to more efficient data caching and less frequent read/write head arm swings in disk drives that comprise the storage (35 in FIG. 1) containing the database (36 in FIG. 1).

Figure 10:
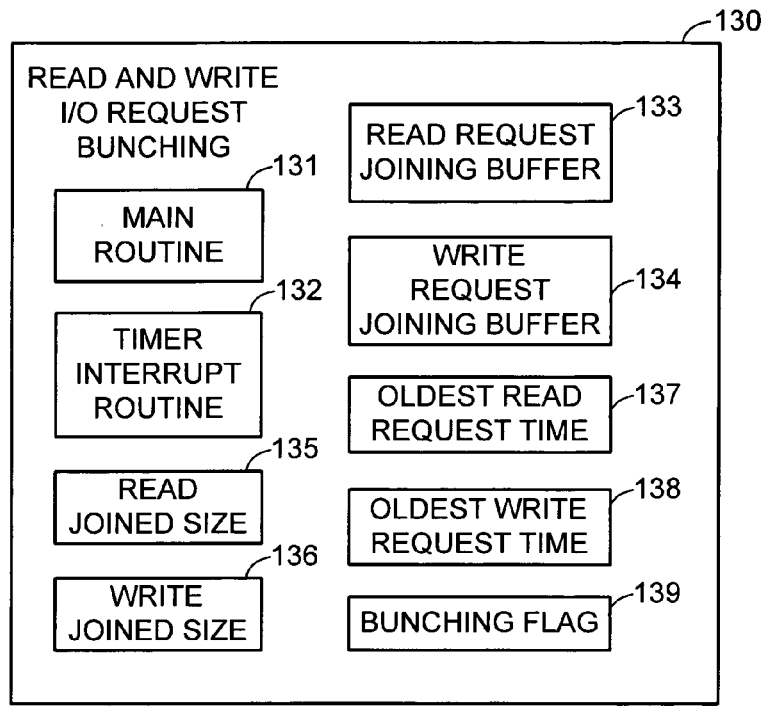
FIG. 10 shows various routines and data structures in an I/O request bunching module that bunches read requests together and bunches write requests together so that the order of the read requests and write requests may change.

FIG. 10 shows an I/O request bunching module 130 for separately bunching the read I/O request together, and separately bunching the write I/O requests together. The I/O request bunching module 130 includes a main routine 131, a timer interrupt routine 132, a read request joining buffer 133, a write request joining buffer 134, a read joined size variable 135, a write joined size variable 136, an oldest request time variable 137, and a bunching flag 138.

Figure 11:
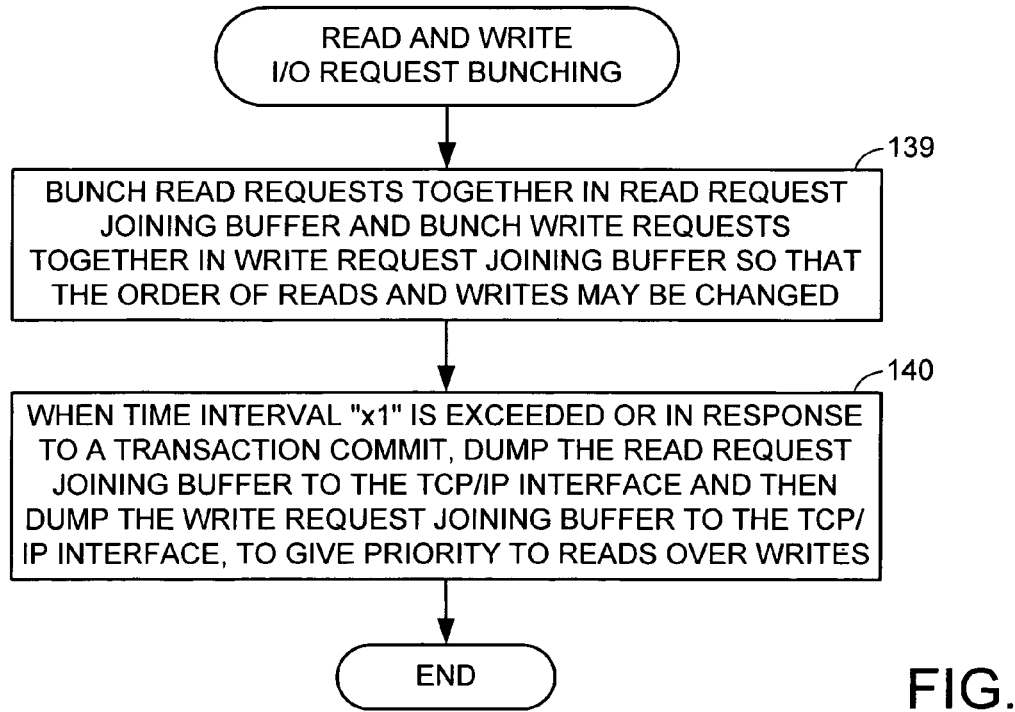
FIG. 11 is a flowchart of read and write I/O request bunching in which the order of the read requests and write requests may change.

FIG. 11 shows the overall operation of the request bunching module 130 of FIG. 10. In a first step 139 of FIG. 11, the read requests are bunched together in the read request joining buffer, and the write requests are bunched in the write joining buffer, so that the order of the read requests and write requests may be changed. In step 140, when the time interval "x1" is exceeded, or in response to a transaction commit request from one of the on-line transaction processing applications, the read request joining buffer is dumped to the TCP/IP interface, and then the write request joining buffer is dumped to the TCP/IP interface. This dumping of the read requests before the write requests gives priority to reads over writes, by moving some of the read I/O request data packets in front of some of the write I/O request data packets in some of the frames.

Figure 12:
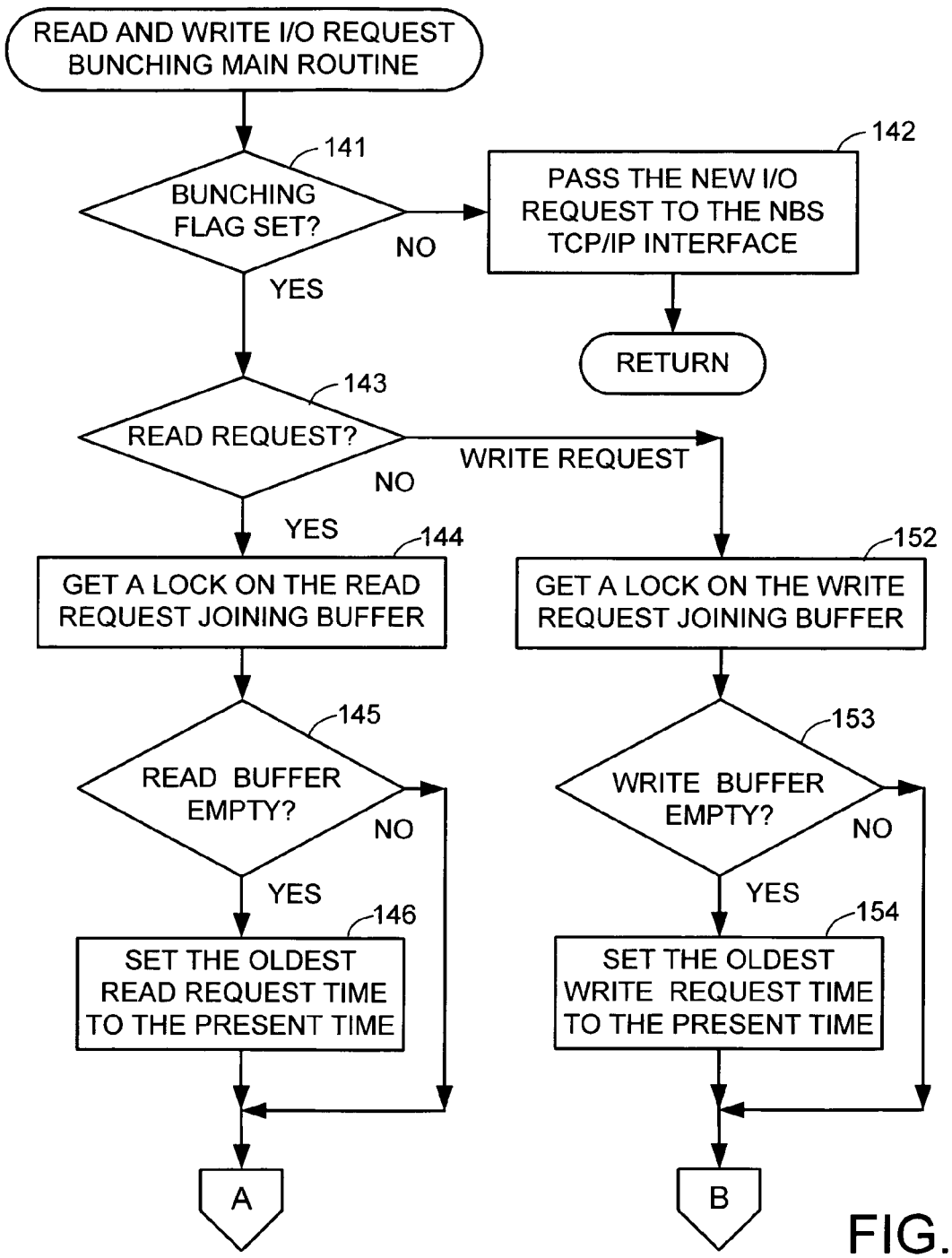
FIGS. 12 and 13 comprise a flowchart of an I/O request bunching main routine that that bunches read requests together and bunches write requests together so that the order of the read requests and write requests may change.
Figure 13:
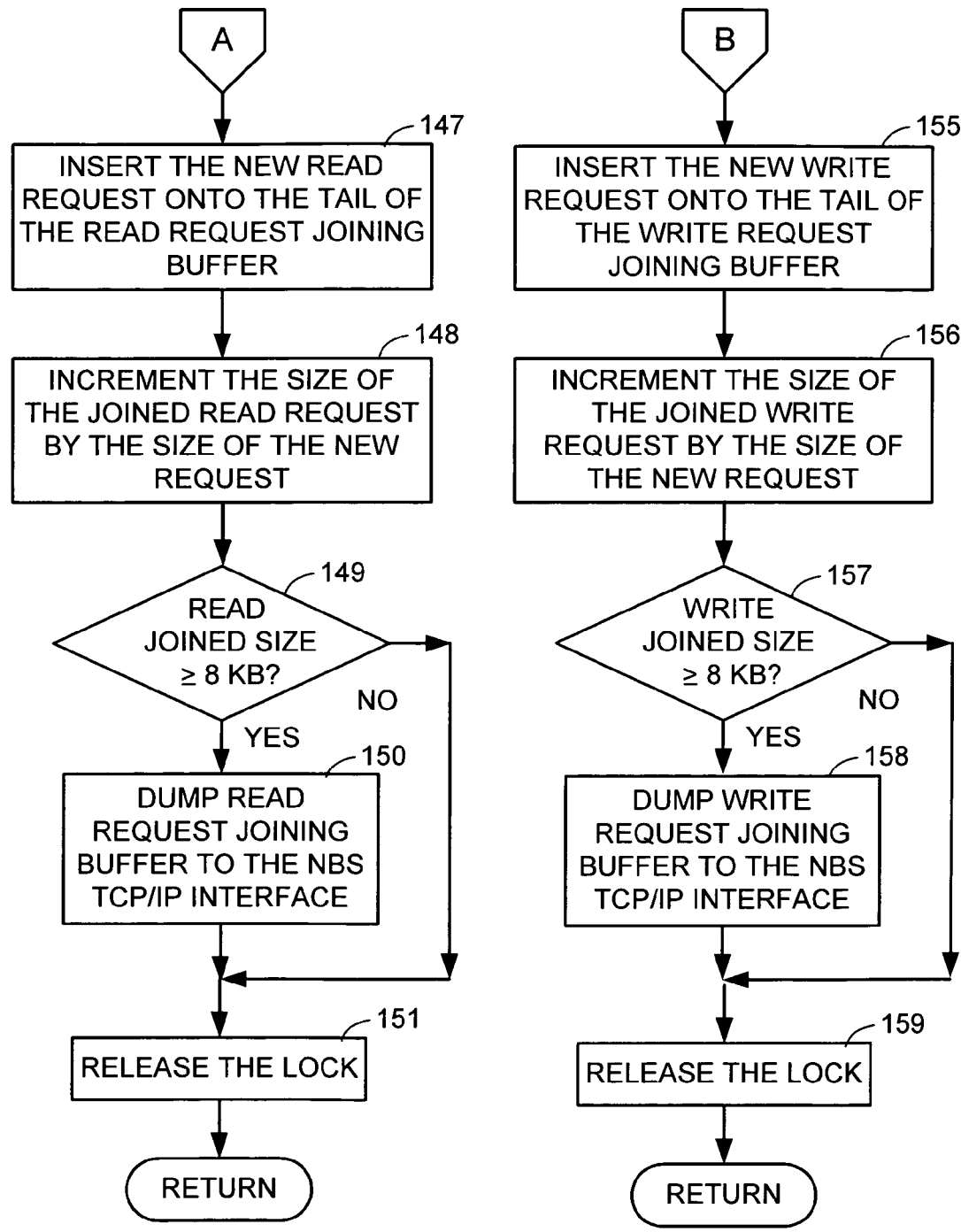

FIGS. 12 and 13 show the main routine (131 in FIG. 10) for read and write I/O request bunching. This main routine is begun upon receipt of a read or write I/O request from one of the on-line transaction processing applications. In a first step 141 of FIG. 12, if the bunching flag is set, then execution branches to step 142 to pass the new I/O request to the network block storage TCP/IP interface. Otherwise, if the bunching flag is set, execution continues from step 141 to step 143. In step 143, if the new request is a read request, then execution continues to step 144. In step 144, a lock is obtained on the read request joining buffer. In step 145, if the read request joining buffer is empty, then execution continues to step 146. In step 146, the oldest read request time is set to the present time. Execution continues from step 146 to step 147 in FIG. 13. Execution also branches to step 147 in FIG. 13 from step 146 if the read request joining buffer is not empty.

In step 147 of FIG. 13, the new read request data packet is inserted onto the tail of the read request joining buffer. In step 148, the size of the joined read request data packet is incremented by the size of the new read request data packet. In step 149, if the read joined size is greater than or equal to 8 kilobytes, then execution continues to step 150. In step 150, the read request joining buffer is dumped to the network block storage TCP/IP interface, for example, the contents of the read request joining buffer are passed to the network block storage TCP/IP interface, the read request joining buffer is cleared, and the time of the oldest read request is cleared. Execution continues from step 150 to step 151. Execution also branches from step 149 to step 151 when the read joined size is not greater than or equal to 8 kilobytes. In step 151, the lock on the read request joining buffer is released, and the main routine is finished.

In step 146 of FIG. 11, if the new request is a not a read request, then it is a write request, and execution branches to step 152. In step 152, a lock is obtained on the write request joining buffer. In step 153, if the write request joining buffer is empty, then execution continues to step 154. In step 154, the oldest write request time is set to the present time. Execution continues from step 154 to step 155 in FIG. 13. Execution also branches to step 155 in FIG. 13 from step 153 if the read request joining buffer is not empty.

In step 155 of FIG. 13, the new write request data packet is inserted onto the tail of the write request joining buffer. In step 156, the size of the joined write request data packet is incremented by the size of the new write request data packet. In step 157, if the write joined size is greater than or equal to 8 kilobytes, then execution continues to step 158. In step 158, the write request joining buffer is dumped to the network block storage TCP/IP interface, for example, the contents of the write request joining buffer are passed to the network block storage TCP/IP interface, the write request joining buffer is cleared, and the time of the oldest write request is cleared. Execution continues from step 158 to step 159. Execution also branches from step 157 to step 159 when the read joined size is not greater than or equal to 8 kilobytes. In step 159, the lock on the write request joining buffer is released, and the main routine is finished.

Figure 14:
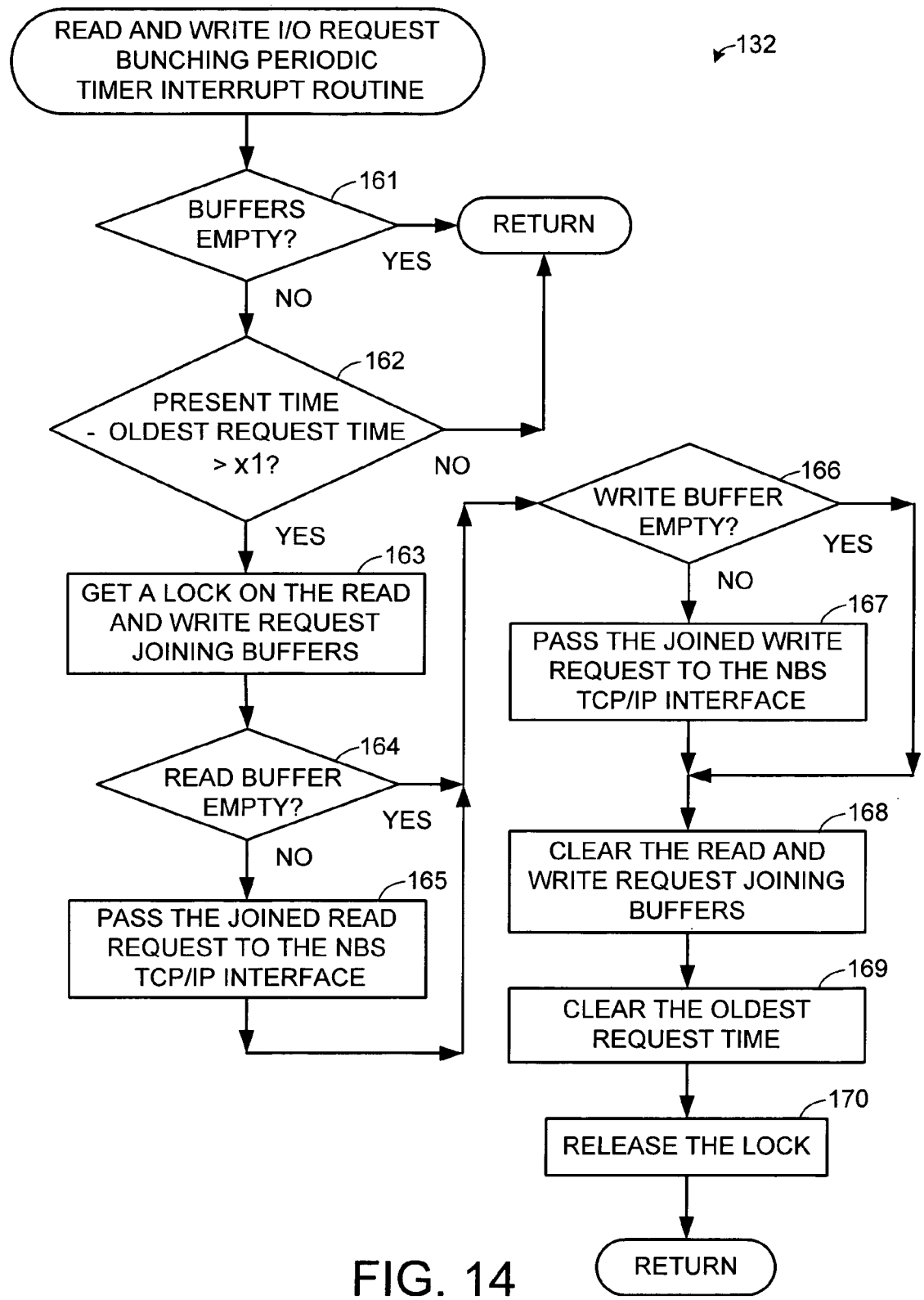
FIG. 14 is a flowchart of an I/O request bunching timer interrupt routine for use with the main routine of FIGS. 12 and 13.

FIG. 14 shows the periodic timer interrupt routine 132 for read and write I/O request bunching. In a first step 161, if the read and write request joining buffers are empty, then execution returns. Otherwise, execution continues from step 161 to step 162. In step 162, if the present time minus the oldest request time (i.e., the oldest of the oldest read request time and the oldest write request time) is not greater than "x1", then execution returns. Otherwise, execution continues from step 162 to step 163. In step 163, a lock is obtained on the read and write request joining buffers. Then in step 164, if the read request joining buffer is not empty, execution continues to step 165. In step 165, the joined read request in the read request joining buffer is passed to the network block services TCP/IP interface. Execution continues from step 165 to step 166. Also, execution branches from step 164 to step 166 if the read request joining buffer is empty.

In step 166, if the write request joining buffer is empty, then execution continues from step 166 to step 167. In step 167, the joined write request in the write request joining buffer is passed to the network block services TCP/IP interface. Execution continues from step 167 to step 168. Also, execution branches from step 166 to step 168 if the write request joining buffer is empty.

In step 168, the read and write request joining buffers are cleared. Then in step 169, the oldest request time is cleared, for example, by setting it to a large value representing a time that is always in the future. Finally, in step 170, the lock is released.

Figure 15:
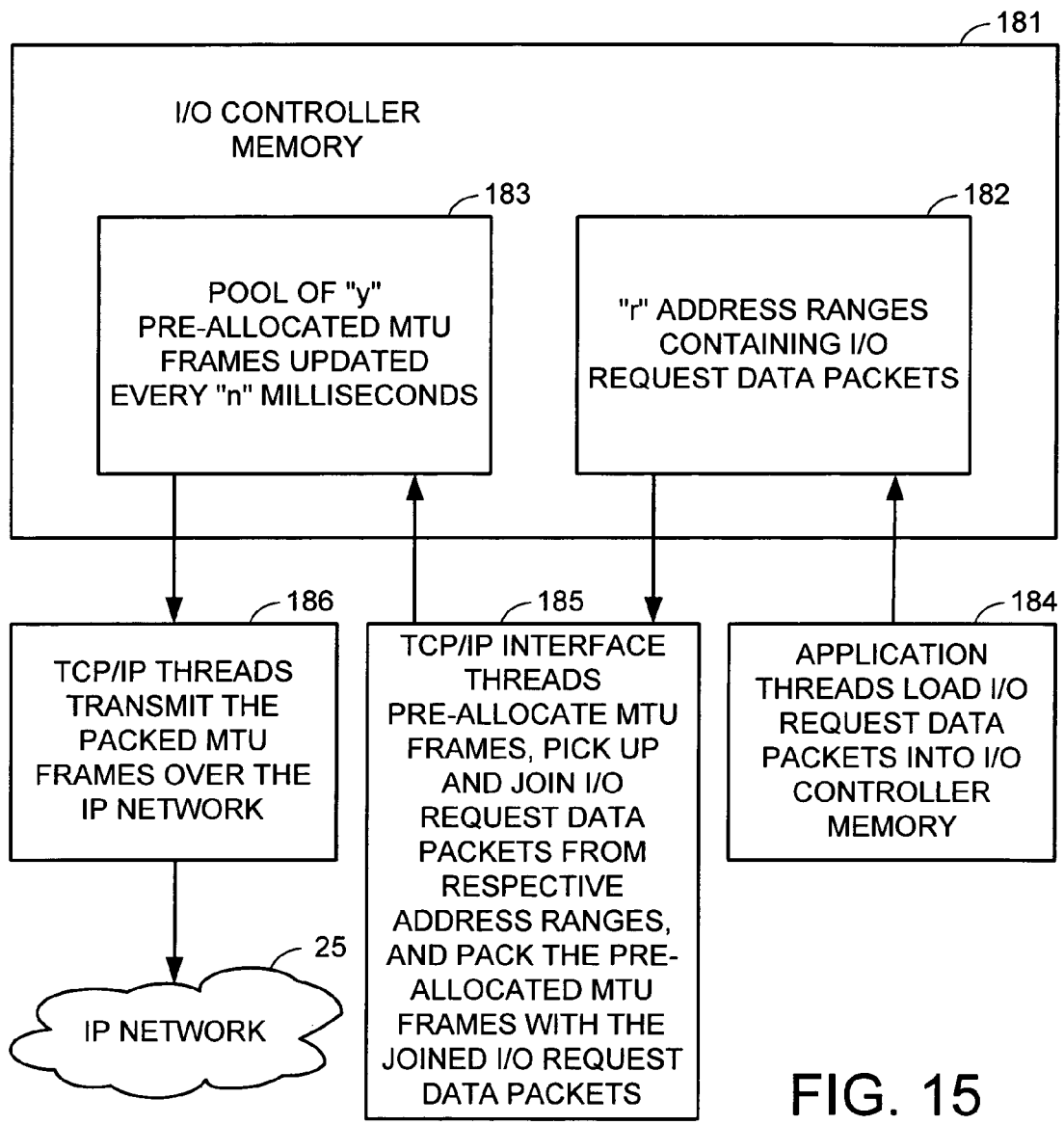
FIG. 15 shows a block diagram of I/O request bunching in a multi-threaded system in which I/O request data packets in a range of I/O controller memory are joined and packed in preallocated MTU frames.

FIG. 15 shows a block diagram of I/O request bunching in a multi-threaded system. Instead of performing I/O request bunching in an add-in function, the request bunching occurs in the host processor's network block storage TCP/IP interface during the transfer of I/O request data packets from the on-line transaction processing applications to preallocated MTU frames.

As shown in FIG. 15, I/O controller memory 181 contains a pool 182 of a certain number "y" of preallocated MTU frames, and the pool 182 is updated every "n" milliseconds. For example, the number of preallocated frames "y" is 400, and "n" is two milliseconds for a system where the time interval "x" is 5 milliseconds. The I/O controller memory 182 also has "r" ranges of addresses, which have received I/O request data packets received within the "n" millisecond update interval. Each address range contains the number of I/O requests that generally can be joined together and packed into MTU frames by a single thread during the "n" millisecond update interval. In effect, these address ranges function as an interface queue between the on-line transaction processing applications and the network block storage TCP/IP interface.

Application threads 184 of the on-line transaction processing applications load the I/O request data packets into the "r" address ranges of the I/O controller memory 182. TCP/IP interface threads 185 preallocate MTU frames. In addition, for each of the "r" address ranges, a respective one of the TCP/IP interface threads 185 picks up I/O request data packets from the address range, joins these I/O request data packets, and packs the joined I/O request data packets into preallocated MTU frames. For example, a single thread generally processes a certain number "NPT" of I/O requests during one "n" millisecond interval, and if there are "NR" new requests in the "n" millisecond interval, then there are about r=NR/NPT address ranges, and a respective thread is initiated to process the I/O requests in each of the "r" address ranges. TCP/IP threads 186 transmit the packed MTU frames over the IP network 25.

For some on-line transaction processing applications, the I/O requests data packets are roughly the same size and are limited to a certain size "Z". In this case, each of the "r" address ranges can be the same size of "Z" times "NPT".

The following table shows a specific example of a series of I/O requests, the threads that concurrently join the I/O requests, and the MTU frames into which the joined requests are packed:

| Memory Address | IO Request # | Size | IO Request Join Review Applied Concurrenlty to large I/O Base | MTU Frame # |
|---|---|---|---|---|
| 000000 | 1 | 0.5k | Thread1 | 1 |
| 000001 | 2 | 1k | | |

-continued

| Memory Address | IO Request # | Size | IO Request Join Review Applied Concurrenlty to large I/O Base | MTU Frame # |
|---|---|---|---|---|
| 000002 | 3 | 0.2k | | |
| 000003 | 4 | 0.3k | | |
| 000004 | 5 | 2k | | |
| 000005 | 6 | 4k | | |
| 000006 | 7 | 0.4k | | 2 |
| 000007 | 8 | 0.66k | | |
| 000008 | 9 | 0.45k | | |
| 000009 | 10 | 2.5k | | |
| 000010 | 11 | .34k | | |
| 000011 | 12 | 1.6k | | |
| 000012 | 13 | 3.4k | | |
| 000013 | 14 | 10k | | |
| 000014 | 15 | 7k | | |
| 000015 | 16 | .543k | | |
| etc | | | | |
| | 100 | end of range or "r" | | |
| 000100 | 101 | 5k | Thread 2 | 3 |
| 000101 | 102 | 2k | | |
| 000102 | 103 | 0.1k | | |
| 000103 | 104 | 0.55k | | 4 |
| 000104 | 105 | 1k | | |
| 000105 | 106 | .44k | | |
| 000106 | 107 | 0.67k | | |
| 000107 | 108 | 0.99k | | |
| 000108 | 109 | 3.5k | | 5 |
| 000109 | 110 | 6.7k | | |
| 000110 | 111 | 0.04k | | |
| 000111 | 112 | 1.2k | | 6 |
| 000112 | 113 | 5.2k | | |
| 000113 | 114 | 0.52k | . . . | 7 |
| etc . . . | | | | |
| | 200 | end of range or "r" | | |

In the example shown by the above table, the I/O request data packets are organized as variable-length records in the controller memory, and the records are mapped to sequential record numbers that serve as respective memory addresses for the I/O request data packets. A first range of memory addresses from 000000 to 000099 stores the I/O request data packets for a first set of one-hundred I/O requests. A first thread has joined and has packed the first six I/O request data packets into a first MTU frame. The first thread is presently joining the seventh I/O request data packet with the eighth I/O request data packet into a second MTU frame. Concurrently, a second thread has packed I/O request data packets 101, 102, and 103 into a third MTU frame; I/O request data packets 104 to 108 into a fourth MTU frame; I/O request data packets 109 to 111 into a fifth MTU frame; and I/O request data packets 112 to 113 into a sixth MTU frame. The second thread is presently joining I/O request data packet 114 with following data packets into a seventh MTU frame.

The following table further shows fifteen threads concurrently processing fifteen-hundred I/O request data packets received by the network block storage TCP/IP interface within a one-millisecond interval:

| "r" Memory Range | IO Request # | Thread |
|---|---|---|
| 0001-000100 | 1-100 | Thread1 |
| 000101-000200 | 101-200 | Thread2 |
| 000201-000300 | 201-300 | Thread3 |
| 000301-000400 | 301-400 | Thread4 |
| 000401-000500 | 401-500 | Thread5 |
| 000501-000600 | 501-600 | Thread6 |
| 000601-000700 | 601-700 | Thread7 |
| 000701-000800 | 701-800 | Thread8 |
| 000801-000900 | 801-900 | Thread9 |
| 000901-0001000 | 901-1000 | Thread10 |
| 0001001-0001100 | 1001-1100 | Thread11 |
| 0001101-0001200 | 1101-1200 | Thread12 |
| 0001201-0001300 | 1201-1300 | Thread13 |
| 0001301-0001400 | 1301-1400 | Thread14 |
| 0001401-0001500 | 1401-1500 | Thread15 |

The arrangement in FIG. 15 permits the TCP/IP interface to be concurrently working on up to "y" MTU frames. The MTU frames can always be preallocated and waiting to receive I/O request data packets by the time that they are packed with the I/O request data packets. Therefore, once an MTU frame is filled with the I/O request data packets or when the time interval "x" is exceeded, the MTU frame is ready to be transmitted over the IP network 25. This will maintain a consistent amount of traffic on the network pipe and will use a predictable amount of processing time on the host processor. The overall performance is improved by more completely filing the MTU frames with the I/O request data packets.

In view of the above, there has been described a performance problem caused by network transmission frames being only partially filled with I/O request packets from the on-line transaction processing applications. This performance problem is solved by re-programming the host processor to join the I/O request data packets from different ones of the on-line transaction processing applications in the same network transmission frames to more completely fill the network transmission frames. Preferably this is done by successively joining the I/O request data packets into the frames and transmitting each data packet in a frame after a delay of no more than a certain time interval. At least some of the frames are transmitted once these frames are filled with some of the data packets so that each of these frames cannot contain an additional data packet. Preferably the certain time interval is adjusted based on network loading so that the certain time interval is increased for increased loading.

What is claimed is:

1. A method of processing a series of data packets for transmission over a data network in a series of frames, each data packet in the series of data packets having a respective time in a time sequence, each frame being capable of transmitting a certain amount of data, the method comprising:

successively joining data packets from the time sequence into the frames and delaying transmission of some of the data packets so that at least some of the frames each contain multiple data packets, and transmitting each data packet in at least one of the frames no later than a certain time interval after the respective time of said each data packet in the time sequence, which includes (a) transmitting each frame in a first set of the frames upon filling said each frame in the first set of frames with data from one or more of the data packets so that said each frame in the first set of frames cannot contain an additional data packet; and (b) upon delaying packet transmission for the certain time interval, transmitting each frame in a second set of the frames which are not filled with at least some of the data packets so that said each frame in the second set of the frames cannot contain an additional data packet in order to ensure that said each data packet is transmitted in at least one of the frames no later than the certain time interval after the respective time of said each data packet in the time sequence.

2. The method as claimed in claim 1, wherein a main routine for processing said each data packet initiates the transmitting of each frame in the first set of the frames upon filling said each frame in the first set of frames with data from one or more of the data packets so that said each frame in the first set of frames cannot contain an additional data packet; and wherein a timer interrupt routine initiates the transmitting of each frame in the second set of the frames which are not filled with at least some of the data packets so that said each frame in the second set of the frames cannot contain an additional data packet in order to ensure that said each data packet is transmitted in at least one of the frames no later than the certain time interval after the respective time of said each data packet in the time sequence.

3. The method as claimed in claim 1, wherein the data packets include read I/O request data packets and write I/O request data packets, and the method includes separately joining the read I/O request data packets together for transmission, and separately joining the write I/O request data packets together for transmission, so that the I/O request data packets have an ordering in the frames that is different from the ordering of the I/O request data packets in the time sequence.

4. The method as claimed in claim 3, wherein some of the read I/O request data packets are moved in front of some of the write I/O request data packets in some of the frames.

5. The method of claim 1, wherein the data packets are I/O request data packets, and the method includes on-line transaction processing applications in a host processor producing the data packets, and a TCP/IP interface in the host processor transmitting the frames over an IP network to network attached storage containing a database accessed by the on-line transaction processing applications.

6. The method of claim 1, wherein the data packets are I/O replies from network attached storage, and the frames are transmitted to a host processor accessing the network attached storage.

7. The method of claim 1, wherein the data packets are stored in a range of addresses of memory, a certain number of frames are preallocated in another region of memory, and the data packets are joined by transfer of the data packets from the range of addresses in memory to the preallocated frames in memory.

8. The method of claim 7, wherein the certain number of preallocated frames are periodically updated.

9. The method of claim 7, which includes application threads loading the data packets into the memory at the range of addresses in memory.

10. The method of claim 7, which includes TCP/IP threads accessing a pool of preallocated frames for transmission of the preallocated frames including the data packets over an IP network.

11. The method as claimed in claim 1, which includes transmitting the frames over a data network, measuring loading on the data network, and dynamically adjusting the duration of the certain time interval based on the measured loading of the data network, the duration of the certain time interval being increased for increased loading on the data network.

12. In a host processor programmed for executing on-line transaction processing applications and having a network block storage interface for accessing network attached storage coupled to the host processor via a data network, a method comprising the host processor joining I/O request data packets from different ones of the on-line transaction processing applications in the same network transmission frames to more completely fill the network transmission frames, which includes the host processor delaying transmission of some of the I/O request data packets by a certain time interval so that at least some of the network transmission frames each contain multiple I/O request data packets, and transmitting each I/O request data packet in a frame no later than the certain time interval after said each I/O request data packet is produced by one of the on-line transaction processing applications, wherein the network transmission frames include a first set of frames in which each frame in the first set of frames is transmitted upon filling said each frame in the first set of frames with data from one or more of the I/O request data packets so that said each frame in the first set of frames cannot contain an additional I/O request data packet; and the network transmission frames include a second set of frames in which each frame in the second set of frames is transmitted upon delaying packet transmission for the certain time interval, and said each frame in the second set of frames is not filled with data from one or more of the I/O request data packets so that said each frame in the second set of frames cannot contain an additional I/O request data packet.

13. The method as claimed in claim 12, which includes the host processor dynamically adjusting the certain time interval in response to loading on the data network, the certain time interval being increased for increased loading on the data network.

14. The method as claimed in claim 12, which includes the host processor executing a periodic timer interrupt routine to insure that said each I/O request data packet is transmitted in said frame no later than said certain time interval after said each I/O request data packet is produced by said one of the on-line transaction processing applications.

15. The method as claimed in claim 12, wherein the I/O request data packets include read I/O request data packets and write I/O request data packets, and the method includes separately joining the read I/O request data packets together for transmission to the network block storage interface, and separately joining the write I/O request data packets together for transmission to the network block storage interface.

16. The method as claimed in claim 15, which includes moving some of the read I/O request data packets in front of some of the write I/O request data packets in some of the frames.

17. The method as claimed in claim 12, which includes turning on and off the joining of the I/O request data packets.

18. The method as claimed in claim 12, wherein the joining of the I/O request data packets is turned off during a bulk transfer of database data.

19. The method as claimed in claim 12, which includes the host processor executing an I/O request bunching routine that intercepts the I/O request data packets sent from the on-line transaction processing applications to the network block storage interface.

20. The method of claim 12, which includes storing the I/O request data packets in a range of addresses of memory, preallocating a certain number of frames in another region of memory, and joining the data packets during transfer of the data packets from the range of addresses in memory to the preallocated frames in memory.

21. The method of claim 20, which includes periodically updating the certain number of preallocated frames.

22. The method as claimed in claim 12, which includes the network attached storage bunching I/O replies into frames for transmission from the network attached storage over the data network to the host processor.

23. A method of solving a performance problem in a host processor programmed for executing on-line transaction processing applications and having a network block storage interface for accessing network attached storage coupled to the host processor via a data network, the performance problem being caused by network transmission frames being only partially filled with I/O request data packets from the on-line transaction processing applications, the performance problem being solved by re-programming the host processor to join the I/O request data packets from different ones of the on-line transaction processing applications in the same network transmission frames to more completely fill the network transmission frames, which includes re-programming the host processor to delay transmission of some of the I/O request data packets by a certain time interval so that at least some of the network transmission frames each contain multiple I/O request data packets, and to transmit each I/O request data packet in a frame no later than the certain time interval after said each I/O request data packet is produced by one of the on-line transaction processing applications, wherein the network transmission frames include a first set of frames in which each frame in the first set of frames is transmitted upon filling said each frame in the first set of frames with data from one or more of the I/O request data packets so that said each frame in the first set of frames cannot contain an additional I/O request data packet; and the network transmission frames include a second set of frames in which each frame in the second set of frames is transmitted upon delaying packet transmission for the certain time interval, and said each frame in the second set of frames is not filled with data from one or more of the I/O request data packets so that said each frame in the second set of frames cannot contain an additional I/O request data packet.

24. The method as claimed in claim 23, which includes re-programming the host processor for dynamic adjustment of the certain time interval in response to loading on the data network, the certain time interval being increased for increased loading on the data network.

25. The method as claimed in claim 23, wherein the re-programming of the host processor includes adding a periodic timer interrupt routine to insure that said each I/O request data packet is transmitted in said frame no later than said certain time interval after said each I/O request data packet is produced by said one of the on-line transaction processing applications.

26. The method as claimed in claim 23, wherein the I/O request data packets include read I/O request data packets and write I/O request data packets, and the host processor is re-programmed for separately joining the read I/O request data packets together for transmission to the network block storage interface, and separately joining the write I/O request data packets together for transmission to the network block storage interface.

27. The method as claimed in claim 26, wherein the host processor is reprogrammed to move some of the read I/O request data packets in front of some of the write I/O request data packets in some of the frames.

28. The method as claimed in claim 23, which includes re-programming the host processor for turning on and off the joining of the I/O request data packets.

29. The method as claimed in claim 23, wherein the host processor is re-programmed by adding an I/O request bunching module that intercepts the I/O request data packets sent from the on-line transaction processing applications to the network block storage interface.

30. The method as claimed in claim 23, wherein the host processor is re-programmed by modifying programming in the network block storage interface that packs the frames with the I/O request data packets.

31. The method as claimed in claim 23, which includes re-programming the network attached storage to bunch I/O replies into frames for transmission from the network attached storage over the data network to the host processor.

32. A host processor programmed for executing on-line transaction processing applications and having a network block storage interface for accessing network attached storage coupled to the host processor via a data network, the host processor being programmed for joining I/O request data packets from different ones of the on-line transaction processing applications into the same network transmission frames to more completely fill the network transmission frames, wherein the host processor is programmed for delaying transmission of some of the I/O request data packets by a certain time interval so that at least some of the network transmission frames each contain multiple I/O request data packets, and transmitting each I/O request data packet in a frame no later than the certain time interval after said each I/O request data packet is produced by one of the on-line transaction processing applications, and wherein the host processor is programmed to transmit each network transmission frame upon the earlier of either filling said each network transmission frame with data from one or more of the I/O request data packets so that said each network transmission frame cannot contain an additional I/O request data packet, or delaying packet transmission for the certain time interval, so that the network transmission frames include a first set of frames in which each frame in the first set of frames is transmitted upon filling said each frame in the first set of frames with data from one or more of the I/O request data packets so that said each frame in the first set of frames cannot contain an additional I/O request data packet, and a second set of frames in which each frame in the second set of frames is transmitted upon delaying packet transmission for the certain time interval, and said each frame in the second set of frames is not filled with data from one or more of the I/O request data packets so that said each frame in the second set of frames cannot contain an additional I/O request data packet.

33. The host processor as claimed in claim 32, wherein the host processor is programmed for dynamically adjusting the certain time interval in response to loading on the data network, the certain time interval being increased for increased loading on the data network.

34. The host processor as claimed in claim 32, wherein the host processor is programmed with a periodic timer interrupt routine to insure that said each I/O request data packet is transmitted in said frame no later than said certain time interval after said each I/O request data packet is produced by said one of the on-line transaction processing applications.

35. The host processor as claimed in claim 32, wherein the I/O request data packets include read I/O request data packets and write I/O request data packets, and the host processor is programmed for separately joining the read I/O request data packets together for transmission to the network block storage interface, and for separately joining the write I/O request data packets together for transmission to the network block storage interface.

36. The host processor as claimed in claim 35, which is programmed for moving some of the read I/O request data packets in front of some of the write I/O request data packets in some of the frames.

37. The host processor as claimed in claim 32, wherein the host processor is programmed for turning on and off the joining of the I/O request data packets.

38. The host processor as claimed in claim 32, wherein the host processor is programmed with an I/O request bunching routine that intercepts the I/O request data packets sent from the on-line transaction processing applications to the network block storage interface.

39. The host processor as claimed in claim 32, wherein the host processor is programmed for storing the I/O request data packets in a range of addresses of memory, preallocating a certain number of frames in another region of memory, and joining the data packets during transfer of the data packets from the range of addresses in memory to the preallocated frames in memory.

40. The host processor as claimed in claim 39, which is programmed for periodically updating the certain number of preallocated frames.

* * * * *